United States Patent
Mermelstein

[15] 3,661,045
[45] May 9, 1972

[54] APPARATUS FOR STABILIZING A ROTARY SAW BLADE

[72] Inventor: Seymour Mermelstein, Newton, Mass.
[73] Assignee: Tyco Laboratories, Waltham, Mass.
[22] Filed: Sept. 17, 1970
[21] Appl. No.: 73,009

[52] U.S. Cl. ...........................83/676, 83/201.15, 143/160 R
[51] Int. Cl. .........................................................B26d 1/12
[58] Field of Search.....................143/160 R; 83/201.15, 676

[56] References Cited

UNITED STATES PATENTS 3,479,097  11/1969  McLauchlan....................83/201.15 X
3,593,763  7/1971  Neild..............................83/201.15 X

*Primary Examiner*—Andrew R. Juhasz
*Assistant Examiner*—David R. Melton
*Attorney*—Schiller & Pandiscio

[57] ABSTRACT

A guide for a rotary saw blade comprising a housing having two inner opposed guide surfaces that define a space for receiving a saw blade mounted on a rotatable arbor and including means for directing a liquid under pressure against the opposite faces of the blade during rotation thereof so as to hydrodynamically stabilize the blade.

18 Claims, 5 Drawing Figures

Seymour Mermelstein
INVENTOR
BY Schiller & Pandiscio
ATTORNEYS.

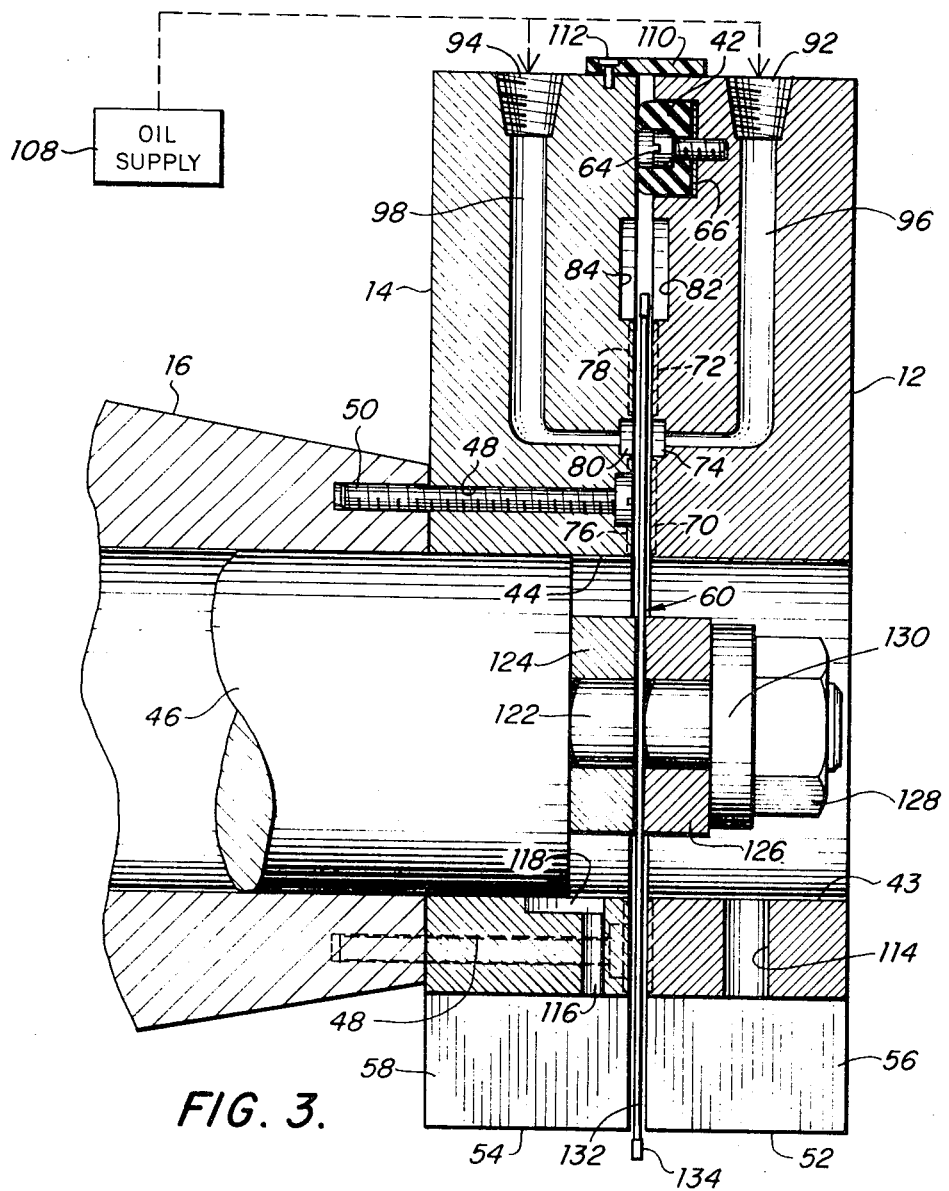
FIG. 3.
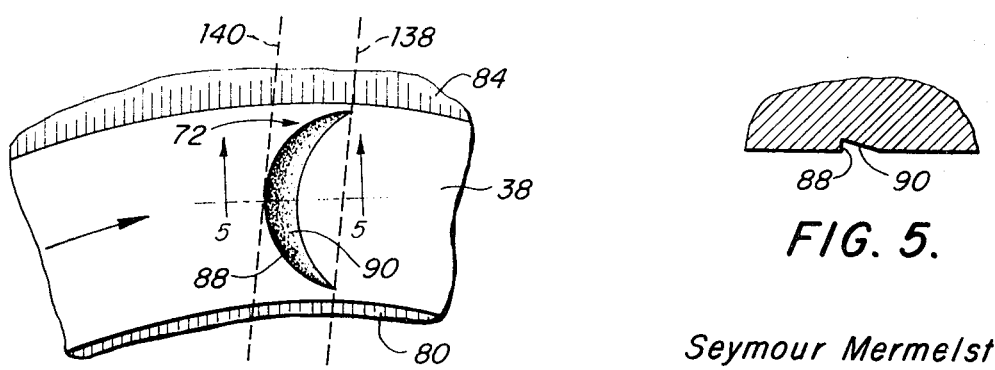
FIG. 4.
FIG. 5.
Seymour Mermelstein
INVENTOR
BY Schiller & Pandiscio
ATTORNEYS.

APPARATUS FOR STABILIZING A ROTARY SAW BLADE

The present invention relates to a saw blade guide and in particular to a guide for hydrodynamically stabilizing a rotary saw blade.

A number of industrial processes involve the use of circular saw blades to cut or slice selected and expensive materials such as semiconductor crystals, ceramics, and metals. For example, wafering machines exist for slicing quartz and semiconductor crystals into thin wafers or chips. In such applications cutting accuracy and the ability to make a fine cut with small loss of material as sawdust are extremely important, both with respect to quality of the end product and materials cost. Accordingly the usual practice is to use a thin saw blade operating at high speeds. However, it has been found that the efficiency of such cutting operations is hampered not only by generation of heat but also by lateral vibration or deflection of the thin saw blade. Other problems involve rapid saw blade wear and dressing the cutting edge of the saw blade.

Therefore, the primary object of the present invention is to provide a new and improved saw blade guide which overcomes the disadvantages of the prior art.

Another object of the present invention is to provide a guide for hydrodynamically stabilizing a saw blade.

Still another object of the present invention is to provide a saw blade guide which is adapted to simultaneously cool the saw blade and stabilize it against vibration.

A further object of the present invention is to provide a guide for stabilizing a thin circular saw blade so that the latter can accurately and precisely cut and slice a workpiece.

Yet another object is to provide a saw blade stabilizing means which minimizes blade wear and facilitates dressing square edged circular saw blades.

Still other objects are to provide a saw blade guide in which the blade does not contact the guide and in which the spacing between the guide and the blade is adjustable.

The above and other objects, advantages, and features of the present invention are accomplished by providing a housing having first and second inner opposed surfaces spaced from one another so as to define a space for receiving a rotary saw blade whose opposite side faces are spaced from the said opposed surfaces. The housing has a side opening for accommodating the rotatable arbor on which the saw blade is mounted and also another opening through which the blade extends for engaging a workpiece. Means are provided for injecting a liquid into the space and for directing the liquid against the opposite faces of the blade during rotation thereof so as to substantially hydrodynamically stabilize the blade.

For a fuller understanding of the nature of the present invention, reference should be had to the following detailed description taken in connection with the accompanying drawings wherein:

FIG. 3 is a cross-sectional view of the same guide in operative position;

FIG. 4 is an enlarged view of a portion of one of the interior surfaces of the same guide; and FIG. 5 is a sectional view taken along the line 5—5 in FIG. 4.

Figure 1:
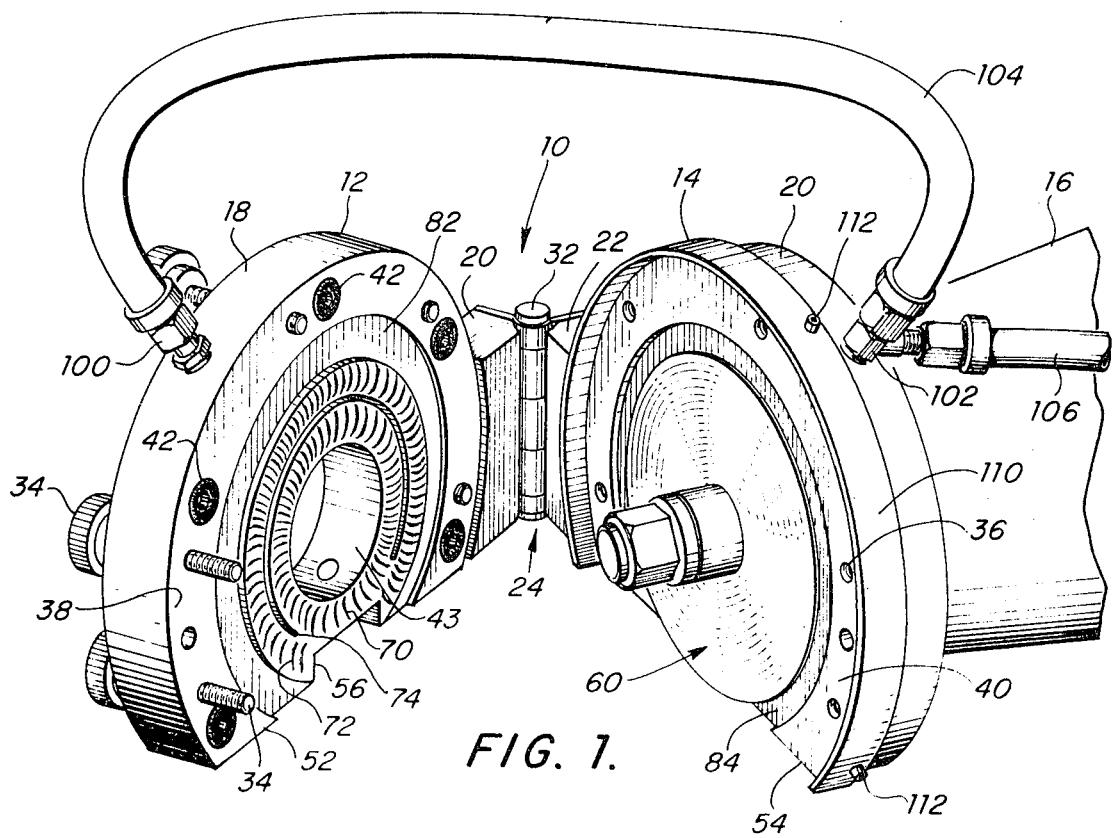
FIG. 1 is a perspective view showing the saw blade guide of the present invention in open position.
Figure 2:
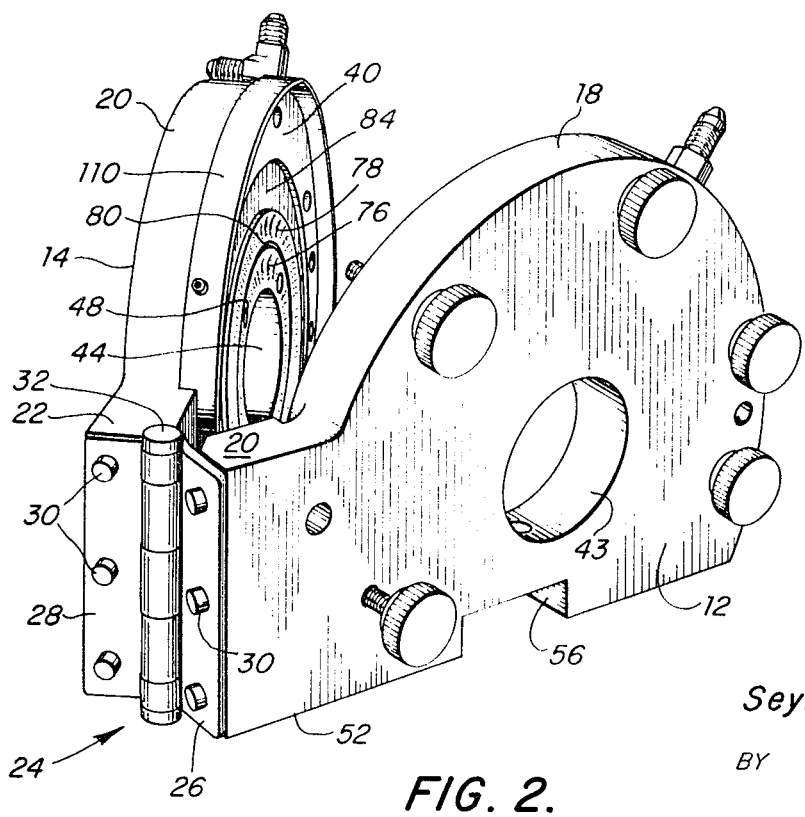
FIG 2 is another perspective view of the same guide.

Referring now to FIG. 1, the saw blade guide of the present invention comprises a housing 10, formed in two parts 12 and 14, which is adapted to be mounted on the end of an arbor housing 16 which forms part of a motorized rotary saw machine (not shown). Housing members 12 and 14 have arcuately shaped outer surfaces 18 and 20 respectively and, except as otherwise noted below, they are of substantially identical configuration, and size. Formed integral with members 12 and 14 are block-like extensions 20 and 22 respectively which serve as anchoring points for a double leaf hinge 24. The latter includes two complementary hinge plates 26 and 28 which are secured to extensions 20 and 22 respectively by, for example, machine screws 30 and are pivotally secured together by a hinge pin 32 which preferably fits very loosely in position for a reason to be explained later.

The member 12 has a plurality of rotatable thumbscrews 34 passing transversely therethrough the spaced around the periphery thereof. The member 14 has a plurality of threaded holes 36 in its inner surface 40 located so that when members 12 and 14 are pivoted into confronting relation with each other, thumbscrews 34 may be screwed into holes 36 and thereby lock members 14 and 16 to one another. Spaced from one another and mounted in the inner surface 38 of member 12 are a plurality of stop pads 42 which are designed to bear against surface 40 of member 14 when members 12 and 14 are brought together as described above. A detailed description of stop pads 42 is presented hereinafter. Members 12 and 14 each have cylindrically shaped holes 43 and 44 which are axially aligned with one another and are disposed substantially orthogonally with respect to inner surfaces 38 and 40. Hole 43 is sized so as to make a snug sliding fit with a saw blade arbor 46 which is rotatably supported in arbor housing 16 to which guide housing 10 is affixed and hole 44 permits access to the end of the arbor without need for opening the guide housing. The member 14 of guide housing 10 is affixed to and supported by arbor housing 16. As seen in FIG. 3, this is achieved by providing in the guide housing member 14 a plurality of countersunk holes 48 disposed concentrically about hole 44 to accomodate cap screws 50 which screw into tapped holes in the end face of the arbor housing 16.

Members 12 and 14 preferably have relatively flat bottom surfaces 52 and 54 respectively. These bottom surfaces are provided with like-shaped slots 56 and 58 which are aligned when the members are locked together to form a continuous slot to accommodate a workpiece which is to be sliced or cut by a saw blade 60 affixed to arbor 46. Although as shown, slots 56 and 58 are oriented substantially orthogonally with respect to inner surfaces 38 and 40, slots 56 and 58 may be oriented at some angle other than 90° with respect to surfaces 38 and 40, e.g. oriented so that the saw blade will slice a quartz crystal at an angle of 35°, 17 minutes to what is called an AT cut.

FIG. 3 shows in cross section one of the stop pads 42. Each of the pads is mounted in a cavity in inner surface 38 of member 12. Pads 42 may be made of plastic or hard rubber or other suitable material and have countersunk holes to receive capscrews 64 which screw into tapped holes in member 12. The extent to which the pads 42 project from the surface 38 of member 12 is adjustable by insertion of one or more shims 66 as shown of appropriate thickness. The setting of stop pads 42 in member 12 determines the spacing between the surfaces 38 and 40 when the members 12 and 14 are locked together by engagement of thumbscrews 34. As explained earlier, hinge pin 32 is loose fitting so that despite the hinged connection between them, when members 12 and 14 are locked together their surfaces 38 and 40 will be parallel to each other and to the opposite faces of saw blade 60.

The inner surface 38 of member 12 has two series of like depressions 70 and 72 disposed in circularly extending arrays concentric with side opening 43 and separated from each other by a narrow channel 74. The inner surface 40 of member 14 has two like arrays of identical depressions 76 and 78 separated by a like circularly extending narrow channel 80 concentric with side opening 44. The channels 74 and 80 terminate short of the slots 56 and 58 respectively. Additionally, the members 12 and 14 are provided with relatively wide circularly extending channels 82 and 84 around the array of outer depressions 72 and 78. Channels 82 and 84 continue around to the bottom edges 52 and 54 of members 12 and 14 as shown.

The configuration and orientation of depressions 70, 72, 76 and 78 are best seen in FIGS. 4 and 5 which show one of the depressions 72. Each depression 72 is in the form of a crescent-shaped radially extending depression that is tapered in a circumferential direction (relative to the axis of arbor 46) so as to have a curved wall 88 which extends substantially perpendicular to surface 38 and an inclined bottom wall 90. The depressions in each array are preferably equally spaced from one another and the depressions of one array may but need not be radially aligned with the depressions of the adjacent array on the same surface. The depressions 70 and 76 and the depressions 72 and 78 respectively are located the same distance from the center axis of side openings 43 and 44. Depressions 70 and 72 may but need not be circumferentially aligned with depressions 76 and 78 when the member 12 and 14 are locked together. However, all of the depressions are oriented so that the direction of rotation of blade 60 is from the deepest to the shallowest portions of the depressions as shown by the arrow in FIG. 4.

The members 12 and 14 also are provided with means for introducing a liquid to the interior of the guide housing for the purpose of cooling and hydrodynamically stabilizing the saw blade. As seen in FIG. 3, the members 12 and 14 are provided with inlet ports 92 and 94 that communicate with interior passageways 96 and 98 that open into channels 74 and 80 respectively. The inlet port 92 is tapped to accept a hose coupling 100 and inlet port 94 is tapped to receive a two way coupling in the form of a tee fitting 102. Coupling 100 and fitting 102 are connected by a flexible base 104. Fitting 102 also is connected by a hose 106 to a supply of cooling liquid which is delivered to the guide housing under pressure. Preferably, the hose 106 is connected to a supply of cutting oil 108 which serves to lubricate as well as to cool and hydrodynamically stabilize the saw blade. By way of example, the source of supply 108 of cooling liquid may take the form of a pressurized supply tank or a reservoir from which the cooling liquid is fed under the pressure of a motor driven pump. The essential thing is that the liquid be delivered to the interior of the guide means under pressure.

Attached to the outer surface 20 of member 14 is a shield 110 which serves to prevent any liquid from being directed out of the interior of the housing 10 at the machine operator. Shield 110 may, for example, be made of a plastic material and preferably is secured to surface 20 of member 14 by screws 112. However, shield 110 could just as easily be secured to member 12 instead of to member 14 and the mode of attachment may be other than by screws 112. Shield 110 projects beyond the face 40 of member 14 so that when the two members 12 and 14 are locked together it will overlap the outer surface 18 of member 12. The cooling liquid supplied to the interior of the housing is drained out of the bottom via channels 82 and 84 and also by two drain holes 114 and 116 that lead from openings 43 and 44 to slots 56 and 58 respectively. In order to assure that the drain hole 116 will not be blocked by arbor 46, it is located as near as possible to surface 40 and additionally an axially extending slot 118 is provided as shown to maximize flow of liquid to drain hole 116 and reduce the likelihood of backflow of the same liquid into the arbor housing 16.

Turning now to FIG. 3, the arbor 46 preferably has a reduced diameter portion 122 on which is mounted the circular saw blade 60. Blade 60 is properly positioned on the arbor extension 122 so that its opposite faces are equally spaced from the inner surfaces 38 and 40 of members 12 and 14. This is achieved by means of a spacer ring 124 made of a rigid metal. The blade is locked in place by frictionally gripping it between spacer 124 and a like spacer 126. The end of the arbor is threaded to receive a nut 128 which compresses the two spacers together against the saw blade by means of one or more washers 130 as required. The outer diameter of spacers 124 and 126 is kept small in order to expose as much as possible of blade 60 for reasons which will be explained later.

Although any thin flat rotary blade could be used in the present invention, the advantages of the invention are particularly notable with blades of the type designed for cutting and slicing semiconductor crystals. Such a blade is shown in the drawings and comprises a circular thin flat faced body 132 having a square or flat cutting edge 134 of slightly greater thickness. In the typical semiconductor or quartz slicing operation, the body of the blade is made of a high speed steel or phosphor bronze and its side faces must be parallel to within ± 0.0001 inch deviation, while the cutting edge 82 may be made of diamond or other material of suitable hardness. The diameter of the blade is such that its cutting edge extends radially beyond the inner edge but short of the outer edge of channels 82 and 84.

The members 14 and 16 may be made of an abrasion resistant material but preferably they are made of steel and their surfaces 38 and 40 are treated or coated to minimize wear or damage by abrasion. Preferably they are coated with Teflon in a phenolic resin binder or with molybdenum disulfide in a phenolic resin binder or resin.

The operation of the saw blade guide is as follows. With a blade 60 mounted on arbor 46 as above described and stop pads 40 adjusted for the desired spacing between surfaces 38 and 40, member 12 is locked to member 14 as shown in FIG. 3. Then a suitable liquid such as, for example, a cutting oil, is pumped through hoses 106 and 104 from oil supply 108 and the arbor 46 is caused to rotate by a motor driven mechanism forming part of the rotary saw machine (not shown). The oil is injected into spaces between the rotating saw blade and surfaces 38 and 40 via passageways 96 and 98 and grooves 74 and 80 at a selected pressure. The pressure is selected according to the clearance between the blade 60 and the adjacent inner surfaces 38 and 40 of the housing. Typically, the clearance is from one to five mils and the oil pressure is set at about 60–80 psi. The oil flows circumferentially around grooves 74 and 80 and spreads radially over the depressions 70, 72, 76, and 78 and also onto the sides of the blade. Most of the oil is thrown off peripherally due to the centrifugal force of the blade but some moves toward the openings 43 and 44 and is drained off via holes 114 and 116. The relatively small outer diameters of spacers 124 and 126 permit a large amount of the area of the side faces of the blade to be exposed to the cooling effect of the oil. The blade is made to rotate in the direction shown by the arrow in FIG. 4 with respect to the depressions 70, 72, 76, and 78. As a result the depressions exert a pressure wedge effect on the oil, creating an axially directed oil pressure against the opposite side faces of the blade. The opposing oil pressures on the opposite faces of the blade 60 are substantially equal, with the result that the blade is hydrodynamically stabilized against lateral movement and lateral vibration.

The oil that is thrown off radially centrifugal force is contained by splash shield 110 and thus is forced into channels 82 and 84 where it flows circumferentially and discharges down onto the workpiece or workpiece support (not shown). The workpiece, i.e., the material to be cut or sliced (not shown) is positioned in slots 56 and 58 for engagement by the cutting edge of the blade 60. Hence the oil supplied to the housing not only cools, lubricates, and stabilizes the blade, but also cools and lubricates the material being cut.

Because the saw blade 60 is hydrodynamically stabilized when confined in the saw blade guide of the present invention, it is possible to dress the cutting edge without detaching it from the arbor. This is done by operating the machine and stabilizing the blade as above described, and maintaining a dressing tool against the edge of the blade so that a square edge is reestablished on the blade.

Although the depressions 70, 72, 76, and 78 are shown as being crescent-shaped, they may have a rectangular or other configuration in face view provided they are wedge-shaped in cross-section as shown in FIG. 5 and are oriented so that the blade rotates in a direction running from their deepest to their shallowest portions. The wedge-shaped cross-section is what provides the desired stabilizing action.

The size, number, and spacing of the depressions are selected according to the degree of hydrodynamic stabilization required and the diameter of the saw blade. For example, with a six inch saw blade having a clearance of 0.001 to 0.003 inch relative to the surfaces 38 and 40, it has been found that excellent blade stabilization is achieved if the radial dimension of the depression is about 0.50 inch or wider, the depth of the deepest portion of the depression is about 0.005 inch, the width of the depressions is about 0.25 inch, and the spacing between successive depressions is about 0.375 inch (the width of the depression is the circumferential dimension which in the case of a crescent-shaped depression as shown in FIG. 4, is the distance between a radially extending line 138 connecting the tips of the depressions and a parallel line 140 passing along the midpoint of its wall 88). The size of grooves 74, 80, 82, and 84 also may vary. Thus for a 6 inch saw blade and depressions as just described, it is preferred that the inner grooves 74 and 80 be about one-quarter inch wide and the outer grooves 82 and 84 be about five-eights inch wide. Variations in the size, number, spacing, and shape of the depressions and the size of the grooves is contemplated to be within the scope of the present invention, as is the use of different size guide housings and saw blades, different saw blade clearances and different liquid pressures. However, the crescent-shaped depressions are preferred since they are easy to produce. They are formed by end milling into the surfaces 38 and 40 with a cylindrical end mill disposed at an acute angle with respect to the aforesaid surfaces.

It is to be appreciated that the housing 10 is adapted to be used with various cutting machines having a rotatable motor driven arbor carrying a rotary saw blade. Since such machines are well known and form no part of this invention except to the extent that the invention is usable in combination therewith, it is not believed necessary to describe or illustrate the same in detail.

I claim:

1. A guide for hydrodynamically stabilizing a rotary saw blade mounted on a rotatable arbor comprising:

a housing having therein first and second opposed surfaces that define a narrow space therebetween for receiving said saw blade and a side opening in at least one of said surfaces for accommodating said arbor, said housing also having means enclosing all but a portion of said space so as to provide another opening through which said blade extends for engaging a workpiece;

passageway means within said housing for injecting a liquid into said space; and means on said first and second surfaces for directing said injected liquid against and at a right angle to the opposite faces of said blade during rotation thereof so as to substantially hydrodynamically stabilize said blade.

2. A guide as set forth in claim 1 wherein said housing comprises first and second separable members and said first and second inner surfaces are integral with said first and second members respectively, and further including means for securing said members in fixed relation to one another.

3. A guide as set forth in claim 2 further including means for adjusting the spacing between said members.

4. A guide as set forth in claim 2 wherein said members are hingedly connected to one another by a loose hinge pin.

5. A guide as set forth in claim wherein said side opening is located substantially perpendicular to said surfaces.

6. A guide as set forth in claim 1 further including means in said housing for draining said liquid from said housing.

7. A guide as set forth in claim 1 further including channel means within said housing for directing said liquid to flow to said another opening.

8. A guide as set forth in claim 1 wherein said passageway means comprises two passages leading from outside said housing to said first and second surfaces.

9. A guide as set forth in claim 1 wherein said liquid directing means comprises first and second like circular arrays of depressions on said first and second opposed surfaces respectively, said depressions on each of said surfaces shaped to create an axially directed liquid pressure on the opposite faces of said saw blade.

10. A guide as set forth in claim 9 further including an additional circular array of depressions on each of said opposed surfaces in radial spaced relation to said first and second arrays of depressions, and a groove between the two arrays of depressions in each opposed surfaces through which said injected liquid is distributed in said space to said depressions.

11. A guide as set forth in claim 9 wherein the depressions in each array are equally spaced from one another and are of a uniform size.

12. A guide as set forth in claim 9 wherein each of said depressions is tapered circumferentially about said side opening.

13. A guide as set forth in claim 12 wherein each of said depressions is crescent-shaped.

14. In combination with apparatus comprising an arbor support, an arbor rotatably mounted in said support, and a saw blade mounted on one end of said arbor, the improvement comprising means for hydrodynamically stabilizing said saw blade, said stabilizing means comprising a housing attached to said arbor support having a side opening in said housing through which said arbor extends, said housing also having first and second surfaces disposed in confronting spaced relations to each other, said blade extending into the space between said first and second surfaces and being spaced axially from each of said surfaces, means for injecting a liquid into the space between said first and second surfaces, and means on said surfaces for directing said liquid against the adjacent faces of said blade so as to substantially hydrodynamically stabilize said blade during rotation thereof.

15. The combination of claim 14 wherein said last mentioned means comprises at least one circular array of depressions on each of said surfaces, said depressions being shaped so as to create an axially directed liquid pressure on the opposite faces of said saw blade.

16. The combination of claim 14 wherein said housing further includes means for channeling said liquid out of said housing.

17. The combination of claim 14 wherein a portion of said blade projects out of said housing a distance sufficient to engage a workpiece, and means for channeling said liquid from the interior of said housing to said workpiece.

18. The combination of claim 17 wherein said housing has a transversely extending slot in the region where said blade projects from said housing.

* * * * *

UNITED STATES PATENT OFFICE
CERTIFICATE OF CORRECTION

Patent No. 3,661,045　　　　　　　Dated May 9, 1972

Inventor(s) Seymour Mermelstein

It is certified that error appears in the above-identified patent and that said Letters Patent are hereby corrected as shown below:

Column 5, Line 54 of Claim 5, insert "2" after the word --claim--.

Signed and sealed this 19th day of September 1972.

(SEAL)
Attest:

EDWARD M. FLETCHER, JR.　　　　　ROBERT GOTTSCHALK
Attesting Officer　　　　　　　　Commissioner of Patents